(12) United States Patent
Chen et al.

(10) Patent No.: US 10,330,274 B2
(45) Date of Patent: Jun. 25, 2019

(54) LIGHT BEAM ADJUSTING DEVICE AND OPTICAL DEVICE FOR VEHICLE LAMP

(71) Applicant: VALEO LIGHTING HUBEI TECHNICAL CENTER Co. Ltd, Wuhan (CN)

(72) Inventors: Chen Chen, Wuhan (CN); Tao Xu, Wuhan (CN); Zhichao Lin, Wuhan (CN); Liang Lin, Wuhan (CN); Qiang Hu, Wuhan (CN)

(73) Assignee: Valeo Lighting Hubei Technical Center Co. Ltd, Wuhan (CN)

( * ) Notice: Subject to any disclaimer, the term of this patent is extended or adjusted under 35 U.S.C. 154(b) by 0 days.

(21) Appl. No.: 15/821,934

(22) Filed: Nov. 24, 2017

(65) Prior Publication Data

US 2018/0142855 A1 May 24, 2018

(30) Foreign Application Priority Data

Nov. 24, 2016 (CN) ...................... 2016 2 1272924 U

(51) Int. Cl.
| | | |
|---|---|---|
| *F21S 6/00* | (2006.01) | |
| *F21S 41/32* | (2018.01) | |
| *F21V 5/00* | (2018.01) | |
| *F21V 7/00* | (2006.01) | |
| *F21S 41/19* | (2018.01) | |
| *F21S 43/31* | (2018.01) | |
| *F21S 43/19* | (2018.01) | |
| *G02B 27/30* | (2006.01) | |
| *G02B 27/09* | (2006.01) | |
| *G02B 19/00* | (2006.01) | |
| *F21S 43/241* | (2018.01) | |
| *F21S 43/20* | (2018.01) | |
| *F21S 43/14* | (2018.01) | |
| *F21S 41/141* | (2018.01) | |

(52) U.S. Cl.
CPC ............. *F21S 41/32* (2018.01); *F21S 41/192* (2018.01); *F21S 41/322* (2018.01); *F21S 43/195* (2018.01); *F21S 43/241* (2018.01); *F21S 43/31* (2018.01); *F21V 5/002* (2013.01); *F21V 5/007* (2013.01); *F21V 5/008* (2013.01); *F21V 7/0091* (2013.01); *G02B 19/0028* (2013.01); *G02B 19/0061* (2013.01); *G02B 27/0994* (2013.01); *G02B 27/30* (2013.01); *F21S 41/141* (2018.01); *F21S 43/14* (2018.01); *F21S 43/26* (2018.01)

(58) Field of Classification Search
USPC ....................................................... 362/257
See application file for complete search history.

(56) References Cited

U.S. PATENT DOCUMENTS

2014/0268871 A1* 9/2014 Morgan .............. H01L 31/0543
362/607

\* cited by examiner

*Primary Examiner* — Jamara A Franklin
(74) *Attorney, Agent, or Firm* — Oblon, McClelland, Maier & Neustadt, L.L.P.

(57) ABSTRACT

An embodiment of present Utility Model application provides a light beam adjusting device and an optical device. The light beam adjusting device includes: one or more first light incidence face arranged to receive an incident light beam; one or more total reflection collimating face arranged to totally reflect the incident light beam from the first light incidence face to collimate the incident light beam; and a first light exit face, from which the collimated light beam is emitted. In the above light beam adjusting device and the optical device, the incident light beam is firstly collimated into a substantially parallel light beam and then exits from the light exit face, thereby improving the luminance of the emergent light and broaden the emergent light.

16 Claims, 4 Drawing Sheets

LIGHT BEAM ADJUSTING DEVICE AND OPTICAL DEVICE FOR VEHICLE LAMP

BACKGROUND OF THE DISCLOSURE

Field of the Disclosure

The present Utility model application relates to the lighting and signaling field, and in particular to a light beam adjusting device and an optical device for a vehicle lamp including the light beam adjusting device.

Description of the Related Art

A lighting or signaling apparatus, for example, a vehicle lamp, is one of the important parts of an automobile vehicle. Traffic regulations and industrial standard have specific requirements on the intensity distribution of the lights emitted from various vehicle lamps (for example, a headlamp, a stop lamp, a turn signal lamp, and so on). Thus, the exit light beam of the vehicle lamp needs to be adjusted by an optical system before it exits from the vehicle lamp.

However, on the other hand, it is desired that the space occupied by the parts in the vehicle lamp and orientation of the parts can be more flexible, to be adapted to style design of various lamps. To this end, a solution that the light of a laser diode is distributed by a light guide has been proposed. In such solution, the laser diode is typically arranged at an end of an elongated light guide rod. The light is reflected continuously at an interface between a wall of the light guide rod and the external environment while traveling in the light guide rod. A decoupling structure (such as prisms) that can destroy the reflection condition may be provided at a suitable position to let the light exit from the light guide rod at the suitable position.

SUMMARY

The present Utility Model application is intended to provide a light beam adjusting device that can enhance luminance of an emergent light beam and broaden the emergent light beam.

The present Utility Model application is also intended to provide an optical device including the light beam adjusting device.

An embodiment of present Utility Model application provides a light beam adjusting device including: one or more first light incidence face arranged to receive an incident light beam; one or more total reflection collimating face arranged to totally reflect the incident light beam from the first light incidence face to collimate the incident light beam; and a first light exit face, from which the collimated light beam is emitted.

In an embodiment, the first light exit face is provided with a plurality of light distribution protrusions arranged to adjust a distribution of intensity of the light which exits from the first light exit face.

In an embodiment, each one of the light distribution protrusions has a surface with a shape arranged to converge or disperse the part of the light beam passing through the one of the light distribution protrusions along a predetermined direction.

In an embodiment, the first light incidence face is provided with a light homogenization structure.

In an embodiment, the light beam adjusting device includes: one or more collimating part, each of which has the total reflection collimating face, the first light incidence face and a second light exit face, wherein the light beam collimated by the total reflection collimating face is emitted from the second light exit face; and a light exit directing part having the first light exit face and a second light incidence face arranged on a side opposite to the first light exit face, the second light incidence face receiving the light beam exiting from the second light exit face, wherein the second light exit face of each collimating part is arranged to face towards the second light incidence face.

In an embodiment, at least one of the second light incidence face and the second light exit face is provided with a light homogenization structure.

In an embodiment, the second light exit face is a stepwise face.

In an embodiment, the second light incidence face is parallel to the second light exit face.

In an embodiment, the second light incidence face and the second light exit face are arranged such that the light beam exiting from the second light exit face is incident on the second light incidence face at an incident angle not greater than 20 degrees.

In an embodiment, the second light incidence face and the second light exit face are arranged such that the light beam exiting from the second light exit face is incident on the second light incidence face at an incident angle of 0 degree.

In an embodiment, the light beam adjusting device includes at least two collimating parts arranged side by side in a linear array.

In an embodiment, the light beam adjusting device is formed integrally.

In an embodiment, the light beam emitted from at least a part of the first light exit face has a width greater than 10 millimeters.

An embodiment of the present Utility Model application also provides an optical device for a vehicle lamp, including: the light beam adjusting device as described in any one of the above embodiments; and one or more light source arranged to emit the incident light beam towards the first light incidence face.

With the light beam adjusting device and the optical device as described in any one of the above embodiments of the present Utility Model application, the incident light beam is firstly collimated into a substantially parallel light beam and then exits from the light exit face, thereby improving the luminance of the emergent light and broaden the emergent light.

DETAILED DESCRIPTION OF PREFERRED EMBODIMENTS

Figure 1:
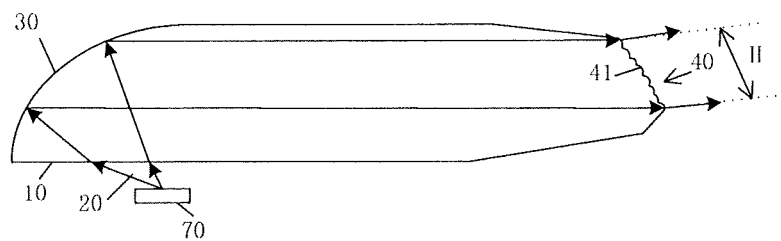
FIG. 1 is a schematic cross sectional view showing a light beam adjusting device according to an embodiment of the present Utility Model application.

Embodiments of the present Utility Model application will below be explained in details by ways of examples with reference to the accompanying drawings. Throughout the description, same or similar reference numerals represent same or similar parts. The following description of the embodiments with reference to the drawings is intended to explain the general inventive concept of the present Utility Model application, instead of limiting the present Utility Model application.

In accordance with a general concept of the present Utility Model application, it provides a light beam adjusting device, including: one or more first light incidence face arranged to receive an incident light beam; one or more total reflection collimating face arranged to totally reflect the incident light beam from the first light incidence face to collimate the incident light beam; and a first light exit face, from which the collimated light beam is emitted.

In addition, in the following detailed description, for purposes of explanation, numerous specific details are set forth in order to provide a thorough understanding of the disclosed embodiments. It will be apparent, however, that one or more embodiments may be practiced without these specific details.

FIG. 1 schematically shows a light beam adjusting device 100 according to an embodiment of the present Utility Model application. The light beam adjusting device 100 includes: a first light incidence face 10 arranged to receive an incident light beam 20; a total reflection collimating face 30 arranged to totally reflect the incident light beam 20 from the first light incidence face 10 to collimate the incident light beam 20; and a first light exit face 40, from which the collimated light beam is emitted. The light beam that exits from the first light exit face 40 may for example be used for a lighting and/or signaling function. It can be seen from FIG. 1 that, in the light beam adjusting device 100 according to the embodiment of the present Utility Model application, an incident light beam 20 is not decoupled by a side wall of a light guide, but is firstly collimated into a substantially parallel light beam and then exits the light exit face. In this way, the luminance and controllability of the emergent light beam may be enhanced, for example, the emergent light beam with larger width H may be obtained. And, enhancement of luminance of the emergent light may improve the applicability of the emergent light beam, for example, it may be used for such as daytime running lamps for an automobile vehicle.

Figure 2:
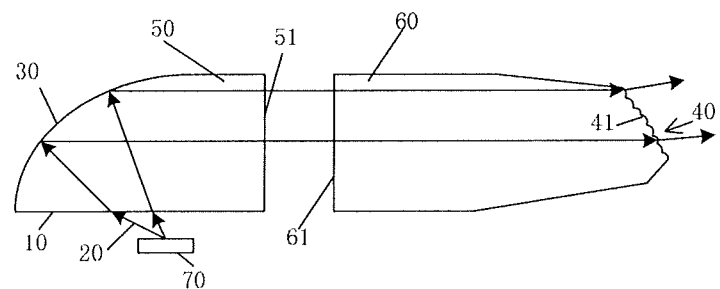
FIG. 2 is a schematic cross sectional view showing a light beam adjusting device according to another embodiment of the present Utility Model application.
Figure 3:
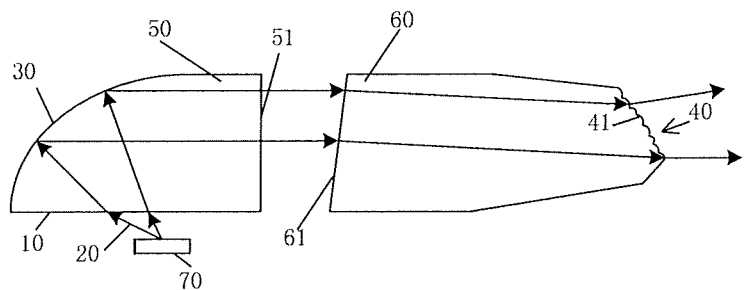
FIG. 3 is a schematic cross sectional view showing a light beam adjusting device according to a further embodiment of the present Utility Model application.
Figure 4:
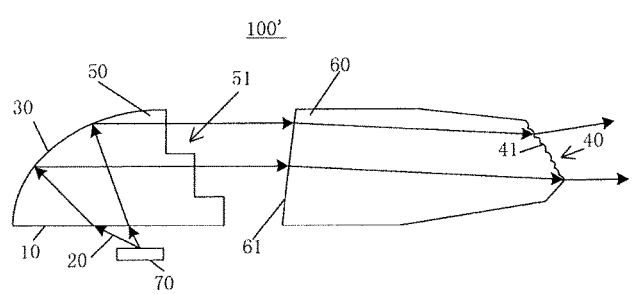
FIG. 4 is a schematic cross sectional view showing a light beam adjusting device according to a still further embodiment of the present Utility Model application.

As an example, the light beam adjusting device 100 may be formed integrally, as shown in FIG. 1. However, the present application is not limited by this. Alternatively, the light beam adjusting device 100 may also be formed of a plurality of parts, for example as shown in FIG. 2 to FIG. 4. As an example, the light beam adjusting device 100' may include: one or more collimating part 50 and a light exit directing part 60. Each collimating part 50 has the total reflection collimating face 30, the first light incidence face 10 and a second light exit face 51. The light beam collimated by the total reflection collimating face 30 is emitted from the second light exit face 51. The light exit directing part 60 has the first light exit face 40 and a second light incidence face 61 arranged on a side opposite to the first light exit face 40. The second light incidence face 61 is arranged to receive the light beam exiting from the second light exit face 51. The second light exit face 51 of each collimating part 50 is arranged to face towards the second light incidence face 61. Such arrangement may provide more flexibility for the structure of the light beam adjusting device 100'.

In an example, the second light incidence face 61 and the second light exit face 51 are arranged such that the light beam exiting from the second light exit face 51 is normally incident on the second light incidence face 61, i.e., the light beam exiting from the second light exit face 51 has an incident angle of 0 degree on the second light incidence face 61, as shown in FIG. 2. In this way, the direction of the light beam may be kept substantially constant when the light beam passes through the second light incidence face 61. However, a modification to the normal incidence is possible. For example, as shown in FIG. 3, the second light incidence face 61 and the second light exit face 51 may also be arranged such that the light beam exiting from the second light exit face 51 is obliquely incident on the second light incidence face 61, i.e., the light beam exiting from the second light exit face 51 has an incident angle greater than 0 degree on the second light incidence face 61. It may allow the second light incidence face 61 to have a certain direction adjusting function. As an example, the incident angle of the light beam exiting from the second light exit face 51 on the second light incidence face 61 may not be greater than 20 degrees. In this way, it is easier to control the direction of the light beam.

As an example, the second light incidence face 61 may be parallel to the second light exit face 51, as illustrated in FIG. 2. In this way, having passed through the second light incidence face 61, the light beam may be still kept in substantially the same direction as that of the light beam that has not reached the second light exit face 51. However, such an arrangement may be changed, for example, the second light incidence face 61 may alternatively be inclined with respect to the second light exit face 51, as shown in FIG. 3. It is helpful to adjust the direction of the light beam suitably. As an example, the second light exit face 51 may be arranged as a stepwise face. It is beneficial to save the space occupied by the parts and materials.

In the embodiments of the present Utility Model application, both the number of the first light incidence face 10 and the number of the total reflection collimating face 30 may be one or more and the number of the first light incidence face 10 may be same to the number of the total reflection collimating face 30, or different from the number of the total reflection collimating face 30. For example, one first light incidence face 10 may correspond to one total reflection collimating face 30; or, alternatively, a plurality of first light incidence faces 10 may correspond to one total reflection collimating face 30, vice versa.

Figure 5:
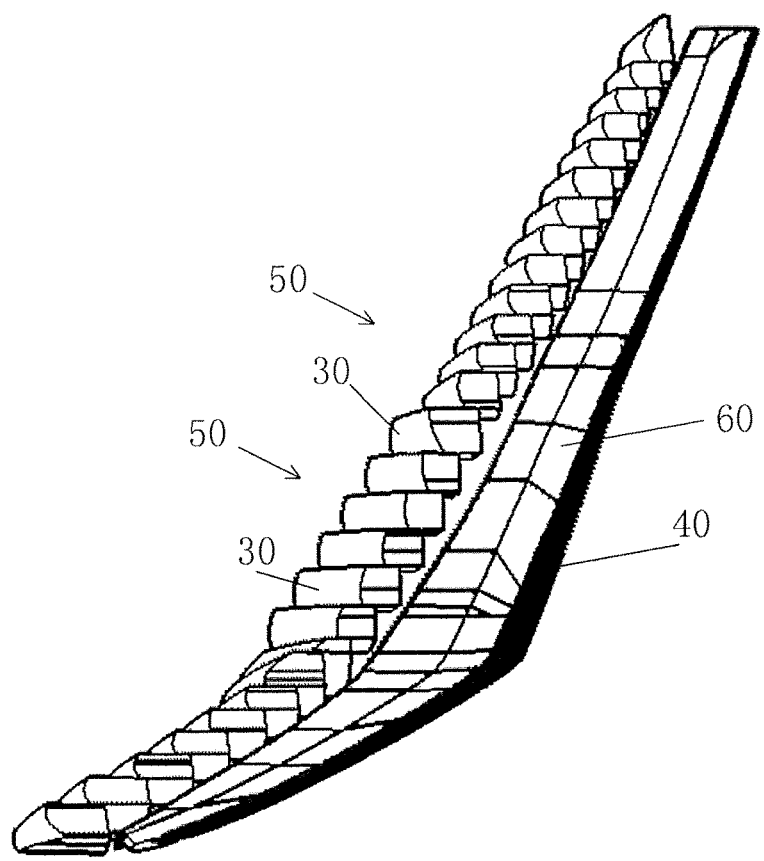
FIG. 5 is a schematic perspective view of the light beam adjusting device shown in FIG. 2.

As such, in the embodiment of the present Utility Model application, more than one collimating part 50 may also be provided. For example, FIG. 5 shows a plurality of collimating parts 50 arranged side by side. The plurality of collimating parts 50 are arranged in sequence along a direction in which the light exit directing part 60 extends. As an example, the shape of the light exit directing part 60 may be designed freely in accordance with the requirements of the design space and lit aspect of vehicle lamp, for example, it may be of a rectilinear shape, a curved shape, even a twisted shape. The collimating parts 50 may also be arranged corresponding to the shape of the light exit directing part 60, to achieve good lit aspect. The applicable width of the light beam emitted from the first light exit face 40 (the widthwise direction is a direction substantially perpendicular to the general extending direction of the light exit directing part 60, as shown in FIG. 1) has a large scope, for example, it may be in a range between 2 millimeters and 25 millimeters, for example, greater than 8 millimeters, or greater than 10 millimeters. As an example, the light beam emitted from at least a part of the first light exit face 40 has a width greater than 10 millimeters, even greater than 20 millimeters.

As an example, the light beam adjusting device includes at least two said collimating parts 50 arranged side by side in a linear array, as shown in FIG. 5. In the examples of the present Utility Model application, different parts of the light exit directing part 60 may have different sizes. Correspondingly, different collimating parts may not also have completely same size, to satisfy the requirements of style of different parts of the light exit directing part 60 correspondingly.

In the present application, the total reflection collimating face 30 is a surface for collimating the light beam by the total reflection of the light beam thereon. As an example, the total reflection collimating face 30 may have curved surface shape such as a paraboloid shape or an ellipsoid shape, or may have any other known reflecting surface shape for collimating the light beam. The total reflection collimating face 30 may convert the light beam emitted from a point light source into a substantially parallel light beam. As an example, the light beam adjusting device 100 may be made from transparent glass, resin or plastic materials, for example, PMMA (polymethy methacrylate) or polycarbonate.

Figure 6:
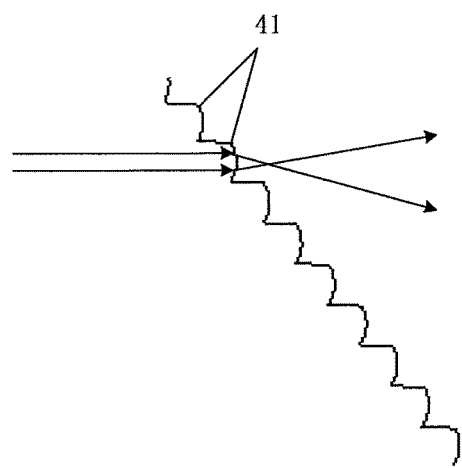
FIG. 6 is a schematic view showing an example of the light distribution protrusions on the first light exit face.

As an example, the first light exit face 40 may be provided with a plurality of light distributing protrusions 41 (as shown in FIG. 1 and FIG. 6) arranged to adjust a distribution of intensity of the light which exits from the first light exit face 40. By means of the first light exit face 40 provided with the plurality of light distributing protrusions 41, the intensity distribution of the emergent light beam may be adjusted into a desired distribution. For example, it may cause the intensity distribution to become more uniform. It may also adjust the intensity distribution at various positions having different distances from the first light exit face 40 to satisfy regulations of the vehicle lamp for an automobile vehicle (for example, Chinese National Standards, European Standards). As an example, the surface shape of the light distribution protrusion 41 may be arranged to adjust the intensity distribution of the light beam that has been collimated by the total reflection collimating face and emitted from the first light exit face 40 to conform with the regulations of any one of vehicle lamps for an automobile vehicle.

FIG. 6 is a schematic view showing effects of the exemplary light distribution protrusions 41 to the light beam. The travel direction of the light is represented schematically by solid arrows. As an example, the surface shape of each of the light distribution protrusions 41 may be arranged to converge (for example a convex surface) or disperse (for example a concave surface) the part of the light beam passing through the one of the light distribution protrusions 41 along a predetermined direction. It should be noted that, even if the surface shape of the light distribution protrusions 41 is arranged to converge the light beam, the converged light beam will still be possible to become a dispersed light beam due to optical properties after it passes the converging point, as shown in FIG. 6. Different surface shapes (for example curvature or inclined shapes) of the light distribution protrusions 41 may change the intensity distribution of the light beam at various positions having different distances from the first light exit face 40, for example, may cause the light intensity to be concentrated on the cross sections of the light beam in a certain range of distance from the first light exit face 40 to satisfy the requirements of luminance. The specific parameters depend on the design requirements of the vehicle lamps having different functions. Regarding the design requirements of the vehicle lamps having different functions, it may refer to the related technical regulations in the art, which will be omitted herein. The converging or dispersing effects of the light distribution protrusions 41 to the light beam may be achieved by refracting the light beam by the surfaces of the light distribution protrusions 41.

As an example, the first light incidence face 10 may be provided with a light homogenization structure. As an example, the light homogenization structure may include protrusions or grains arranged on the first light incidence face 10. The protrusions or grains may for example have a height or depth of 0.01 mm to 0.05 mm. The light homogenization structure may cause more uniform intensity distribution of the light beam passing through the first light incidence face 10 in the cross section thereof. As an example, similarly, such light homogenization structure may also be arranged on at least one of the second light incidence face 61 and the second light exit face 51.

The light beam adjusting device 100, 100' according to the embodiment of the present Utility Model application may achieve higher optical efficiency. Its optical efficiency may be increased for example by 15%, 20% or 25% in comparison with the conventional solution in which the light is decoupled by the light guide. And, as an example, the light beam adjusting device 100, 100' according to the embodiments of the present Utility Model application may also simplify the structure, save materials and reduce weight.

An embodiment of the present Utility Model application also provides an optical device for a vehicle lamp. The optical device includes the light beam adjusting device 100, 100' as described in any one of the above embodiments and one or more light sources 70 arranged to emit the incident light beam 20 towards the first light incidence face 10.

As an example, the light source 70 may include a white light LED or a monochromatic light LED. Alternatively, it may also be any other known light sources in the art, such as an incandescent lamp. As an example, when the light source 70 includes LEDs, it may be carried by a plurality of small printed circuit boards to adapt the change of style of the light exit directing part 60; thus, a flexible printed circuit board is no longer necessary. It may save manufacturing costs.

In the embodiments of the present Utility Model application, the optical device may be supported or suspended by any known suitable devices for holding optical elements, for example a supporting seat or a suspension arm.

The vehicle lamp according to embodiments of the present Utility Model application may include any types of illumination lamps and/or signaling lamps for an automobile vehicle, for example, headlamps, central high mounted stop lamps, turn signal lamp, position lamps, rear stop lamps and so on. The optical device according to embodiments of the present Utility Model application may also be used in any fields other than the vehicle lamps, for example, streetlamps, advertising lamps and so on.

The present disclosure has been explained with reference to drawings. However, the examples shown in drawings are intended to exemplarily illustrate the embodiments of the present application by way of examples, instead of limiting the present Utility Model. Scales in the drawings are only provided by way of examples, and are not intended to limit the present Utility Model.

Although some of embodiments according to a general concept of the present disclosure have been illustrated and explained, the skilled person in the art will understand that these embodiments may be modified without departing principles and spirits of the present disclosure. The scope of the prevent Utility Model will be defined by the appended claims and equivalents thereof.

What is claimed is:

1. A light beam adjusting device, comprising:
   one or more collimating parts, each collimating part including
   one or more first light incidence faces arranged to receive an incident light beam,
   one or more total reflection collimating faces arranged to totally reflect the incident light beam from a first light incidence face to collimate the incident light beam, and
   a second light exit face; and
   a first light exit face, from which the collimated light beam is emitted.

2. The light beam adjusting device according to claim 1, wherein the first light exit face is provided with a plurality of light distribution protrusions arranged to adjust a distribution of intensity of the light which exits from the first light exit face.

3. The light beam adjusting device according to claim 2, wherein each one of the light distribution protrusions has a surface with a shape arranged to converge or disperse the part of the light beam passing through the one of the light distribution protrusions along a predetermined direction.

4. The light beam adjusting device according to claim 3, wherein the light beam adjusting device comprises:
   a light exit directing part having the first light exit face and a second light incidence face arranged on a side opposite to the first light exit face, the second light incidence face receiving the light beam exiting from the second light exit face,
   wherein the second light exit face of each collimating part is arranged to face towards the second light incidence face.

5. The light beam adjusting device according to claim 2, wherein the light beam adjusting device comprises:
   a light exit directing part having the first light exit face and a second light incidence face arranged on a side opposite to the first light exit face, the second light incidence face receiving the light beam exiting from the second light exit face,
   wherein the second light exit face of each collimating part is arranged to face towards the second light incidence face.

6. The light beam adjusting device according to claim 2, wherein the light beam emitted from at least a part of the first light exit face has a width greater than 10 millimeters.

7. The light beam adjusting device according to claim 1, wherein the first light incidence face is provided with a light homogenization structure.

8. The light beam adjusting device according to claim 1, wherein at least one of a second light incidence face and the second light exit face is provided with a light homogenization structure.

9. The light beam adjusting device according to claim 8, wherein the second light incidence face is parallel to the second light exit face.

10. The light beam adjusting device according to claim 8, wherein the second light incidence face and the second light exit face are arranged such that the light beam exiting from the second light exit face is incident on the second light incidence face at an incident angle not greater than 20 degrees.

11. The light beam adjusting device according to claim 10, wherein the second light incidence face and the second light exit face are arranged such that the light beam exiting from the second light exit face is incident on the second light incidence face at an incident angle of 0 degree.

12. The light beam adjusting device according to claim 1, wherein the second light exit face is a stepwise face.

13. The light beam adjusting device according to claim 1, wherein the light beam adjusting device comprises at least two said collimating parts arranged side by side in a linear array.

14. The light beam adjusting device according to claim 1, wherein the light beam emitted from at least a part of the first light exit face has a width greater than 10 millimeters.

15. A light beam adjusting device comprising:
    one or more first light incidence faces arranged to receive an incident light beam;
    one or more total reflection collimating faces arranged to totally reflect the incident light beam from the first light incidence face to collimate the incident light beam;
    a first light exit face, from which the collimated light beam is emitted;
    one or more collimating part, each of which has the total reflection collimating face, the first light incidence face and a second light exit face, wherein the light beam collimated by the total reflection collimating face is emitted from the second light exit face; and
    a light exit directing part having the first light exit face and a second light incidence face arranged on a side opposite to the first light exit face, the second light incidence face receiving the light beam exiting from the second light exit face,
    wherein the second light exit face of each collimating part is arranged to face towards the second light incidence face.

16. An optical device for a vehicle lamp, comprising:
    a light beam adjusting device, including:
    one or more collimating parts, each collimating part including
    one or more first light incidence faces arranged to receive an incident light beam, and
    one or more total reflection collimating faces arranged to totally reflect the incident light beam from a first light incidence face to collimate the incident light beam,
    a second light exit face, and
    a first light exit face, from which the collimated light beam is emitted; and
    one or more light source arranged to emit the incident light beam towards the first light incidence face.

* * * * *